United States Patent
Lin et al.

(10) Patent No.: US 9,941,804 B1
(45) Date of Patent: Apr. 10, 2018

(54) POWER SUPPLY SYSTEM

(71) Applicant: CYBER POWER SYSTEMS, INC., Taipei (TW)

(72) Inventors: Pei-Yung Lin, Taipei (TW); Hong-Lun Wang, Taipei (TW); Cheng-Yang Su, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 0 days.

(21) Appl. No.: 15/639,360

(22) Filed: Jun. 30, 2017

(30) Foreign Application Priority Data

May 19, 2017 (CN) .......................... 2017 1 0355470

(51) Int. Cl.
| | |
|---|---|
| H02M 3/335 | (2006.01) |
| H01F 27/42 | (2006.01) |
| H01R 27/02 | (2006.01) |
| H01R 31/06 | (2006.01) |
| H04L 12/10 | (2006.01) |
| H01M 10/46 | (2006.01) |
| H01F 38/14 | (2006.01) |

(52) U.S. Cl.
CPC ........ *H02M 3/33576* (2013.01); *H01F 27/42* (2013.01); *H01F 38/14* (2013.01); *H01M 10/46* (2013.01); *H01R 27/02* (2013.01); *H01R 31/06* (2013.01); *H04L 12/10* (2013.01)

(58) Field of Classification Search
CPC ......... H02M 3/33507; H02M 3/33523; H02M 3/33569; H02M 3/33576; H02M 3/33595; H01F 27/42; H01F 38/14; H01M 10/46; H01R 27/02; H01R 31/06; H04L 12/10

USPC .................... 363/19, 21.02, 49, 65
See application file for complete search history.

(56) References Cited

U.S. PATENT DOCUMENTS

| | | | | |
|---|---|---|---|---|
| 5,739,667 | A | * | 4/1998 | Matsuda ............... H02J 7/0072 320/128 |
| 6,075,345 | A | * | 6/2000 | Lee ....................... H02J 7/0031 320/138 |
| 8,350,532 | B2 | * | 1/2013 | Caraghiorghiopol ... G06F 1/263 320/140 |
| 2003/0085621 | A1 | * | 5/2003 | Potega .................. B60L 11/185 307/18 |
| 2008/0179956 | A1 | * | 7/2008 | Jiang ...................... H02J 9/061 307/66 |

(Continued)

*Primary Examiner* — Yemane Mehari
(74) *Attorney, Agent, or Firm* — Bacon & Thomas, PLLC (57) ABSTRACT

A power supply system having an adapter and a converter is provided. The adapter includes a first inputting terminal coupled to a first power and a first outputting terminal coupled to a first loading device. The converter includes a detecting controller, a second inputting terminal coupled to the detecting controller, a second outputting terminal, and a third outputting terminal. The second outputting terminal and the third outputting terminal are coupled in parallel to the detecting controller. The third outputting terminal is coupled to the position between the first inputting terminal and the first outputting terminal of the adapter through external connection. The second inputting terminal is coupled to a second power, and a second loading device is coupled to the second outputting terminal. The detecting controller drives the second power supply to the first loading device according to the power supply status of the first power.

20 Claims, 2 Drawing Sheets

(56) References Cited

U.S. PATENT DOCUMENTS

| | | | |
|---|---|---|---|
| 2012/0326530 A1* | 12/2012 | Tang | G06F 1/3228 |
| | | | 307/116 |
| 2013/0009470 A1* | 1/2013 | Chuang | H02J 7/0065 |
| | | | 307/31 |
| 2016/0299555 A1* | 10/2016 | Rucker | H05B 33/0845 |
| 2016/0359405 A1* | 12/2016 | Li | H02M 1/36 |
| 2016/0380462 A1* | 12/2016 | Zhang | H02J 7/04 |
| | | | 320/107 |

* cited by examiner

POWER SUPPLY SYSTEM

BACKGROUND OF THE INVENTION

Field of the Invention

The present invention relates to a power supply system, and more particularly, the present invention is relates to a power supply system suited for switching power supply paths.

Description of Related Art

With the popularity of various types of electrical equipment, adapters are also widely used in various types of electrical equipment, especially network equipments. In detail, with the rapid development of network systems, optical fiber communication systems are also developed and used vigorously. When the optical fiber communication system is installed in user terminal, an Optical Network Termination (ONT) is applied to provide convenient and fast information transmission service.

However, ONT is always coupled the utility power electrically through an adapter for providing the required power of ONT in operation. Therefore, once the utility power can not supply power normally, ONT can be affect and can not works normally.

SUMMARY OF THE INVENTION

Accordingly, an object of the present invention is to provide a power supply system for providing at least one power supply path conveniently when the utility power can not supply power normally.

To achieve the foregoing and other objects, a power supply system is provided. The power supply system comprises an adapter and a converter. The adapter has a first inputting terminal and a first outputting terminal, wherein the first inputting terminal is suitable for coupling with a first power, and a first loading device is suitable for coupling with the first outputting terminal. The converter has a detection controller, a second inputting terminal, a second outputting terminal and a third outputting terminal. The second inputting terminal and the detection controller are coupled electrically. The second outputting terminal and the third outputting terminal are coupled to the detection controller in parallel. The third outputting terminal is electrically coupled between the first inputting terminal and the first outputting terminal of the adapter through external connection. The second inputting terminal is suitable for coupling with a second power, and a second loading device is suitable for coupling with the second outputting terminal. Wherein, the detecting controller drives the second power supply to the first loading device according to the power supply status of the first power.

In one embodiment of the present invention, when the power supply status of the first power is normal, the detection controller drives the second power supply to the second loading device, when the power supply status of the first power is abnormal, the detection controller drives the second power supply to the first loading device, and drives the second power supply to the second loading device continuously or stop supplying to the second loading device.

In one embodiment of the present invention, the detection controller comprises a first switch, a second switch, a detector and a controlling circuit. The first switch is electrically coupled between the second inputting terminal and the third outputting terminal. The second switch is electrically coupled between the second inputting terminal and the second outputting terminal. The detector is electrically coupled to the third outputting terminal for detecting power information transmitted between the first inputting terminal and the first outputting terminal of the adapter through the third outputting terminal, and then generates a detecting result. The controlling circuit is electrically coupled to the detector for receiving the detecting result, and controls the first switch and the second switch according to the detecting result.

In one embodiment of the present invention, when power information transmitted between the first inputting terminal and the first outputting terminal of the adapter is normal, the controlling circuit controls the first switch to be OFF, and controls the second switch to be ON, which drives the second power supply to the second loading device, when power information transmitted between the first inputting terminal and the first outputting terminal of the adapter is abnormal, the controlling circuit controls the first switch to be ON, and controls the second switch to be OFF, which drives the second power supply to the first loading device.

In one embodiment of the present invention, when the status of one of the first switch and the second switch is ON, the status of another of the first switch and the second switch is OFF.

In one embodiment of the present invention, the detector is electrically coupled between the first switch and the third outputting terminal for detecting power information transmitted between the first inputting terminal and the first outputting terminal of the adapter through the third outputting terminal.

In one embodiment of the present invention, the detection controller further comprises a DC/DC controller, one terminal of the DC/DC controller is electrically coupled to the second power, and another terminal of the DC/DC controller is coupled with the second outputting terminal and the third outputting terminal.

In one embodiment of the present invention, the detector is a current detecting circuit, a current detector, a voltage detecting circuit or a voltage detector.

In one embodiment of the present invention, the power supply system further comprises a first external wire, and the adapter further comprises a third inputting terminal and an adapter body, the converter further comprises a converter body, the first inputting terminal, the first outputting terminal and the third inputting terminal are exposed out of the adapter body, and the third inputting terminal is electrically coupled between the first inputting terminal and the first outputting terminal, the second inputting terminal, the second outputting terminal and the third outputting terminal are exposed out of the converter body, the first external wire is electrically coupled between the third outputting terminal of the converter and the third inputting terminal of the adapter, which makes the third outputting terminal of the converter is electrically coupled between the first inputting terminal and the first outputting terminal of the adapter through external connection.

In one embodiment of the present invention, the first power is a utility power, the second power is a mobile power or a DC uninterrupted power supply, the converter is a mobile power converter, the first loading device is an Optical Network Termination, and the second loading device is a mobile device.

To achieve the foregoing and other objects, a power supply system is further provided. This power supply system comprises the above adapter, the above converter and a third power. The first inputting terminal of the adapter is suitable for coupling with the first power, and the first loading device is suitable for coupling with the first outputting terminal of the adapter. The second inputting terminal of the converter is suitable for coupling with the second power, and the second loading device is suitable for coupling with the second outputting terminal of the converter. The third power is electrically coupled between the first inputting terminal and the first outputting terminal of the adapter. Wherein, the detection controller drives the second power supply to the first loading device according to the power supply status of the first power and the third power.

In one embodiment of the present invention, when the power supply status of the first power is normal, the detection controller drives the second power supply to the second loading device, when the power supply status of the first power is abnormal, and the power supply status of the third power is normal, the detection controller drives the third power supply to the first loading device, and drives the second power supply to the second loading device continuously, when the power supply status of the first power and the third power is abnormal, the detection controller drives the second power supply to the first loading device, and drives the second power supply to the second loading device continuously or stop supplying to the second loading device.

In one embodiment of the present invention, the detection controller comprises a first switch, a second switch, a detector and a controlling circuit. The first switch is electrically coupled between the second inputting terminal and the third outputting terminal. The second switch is electrically coupled between the second inputting terminal and the second outputting terminal. The detector is electrically coupled to the third outputting terminal for detecting power information transmitted between the first inputting terminal and the first outputting terminal of the adapter through the third outputting terminal, and then generates a detecting result. The controlling circuit is electrically coupled to the detector for receiving the detecting result, and controls the first switch and the second switch according to the detecting result.

In one embodiment of the present invention, when power information transmitted between the first inputting terminal and the first outputting terminal of the adapter is normal, the controlling circuit controls the first switch to be OFF, and controls the second switch to be ON, which drives the second power supply to the second loading device, when power information transmitted between the first inputting terminal and the first outputting terminal of the adapter is abnormal, the controlling circuit controls the first switch to be ON, and controls the second switch to be OFF, which drives the second power supply to the first loading device.

In one embodiment of the present invention, when the status of one of the first switch and the second switch is ON, the status of another of the first switch and the second switch is OFF.

In one embodiment of the present invention, the detector is electrically coupled between the first switch and the third outputting terminal for detecting power information transmitted between the first inputting terminal and the first outputting terminal of the adapter through the third outputting terminal.

In one embodiment of the present invention, the detection controller further comprises a DC/DC controller, one terminal of the DC/DC controller is electrically coupled to the second power, and another terminal of the DC/DC controller is coupled with the second outputting terminal and the third outputting terminal.

In one embodiment of the present invention, the detector is a current detecting circuit, a current detector, a voltage detecting circuit or a voltage detector.

In one embodiment of the present invention, the power supply system further comprises a first external wire and a second external wire, and the adapter further comprises a third inputting terminal and an adapter body, the converter further comprises a converter body, the first inputting terminal, the first outputting terminal and the third inputting terminal are exposed out of the adapter body, and the third inputting terminal is electrically coupled between the first inputting terminal and the first outputting terminal, the second inputting terminal, the second outputting terminal and the third outputting terminal are exposed out of the converter body, the first external wire and the second external wire are electrically coupled between the third outputting terminal of the converter and the third inputting terminal of the adapter, which makes the third outputting terminal of the converter and the third power are electrically coupled between the first inputting terminal and the first outputting terminal of the adapter through external connection.

In one embodiment of the present invention, the first power is a utility power, the second power is a mobile power, the third power is a DC uninterrupted power supply, the converter is a mobile power converter, the first loading device is an Optical Network Termination, and the second loading device is a mobile device.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present invention will become more fully understood from the detailed description given herein below and the accompanying drawings which are given by way of illustration only, and thus are not limitative of the present invention.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
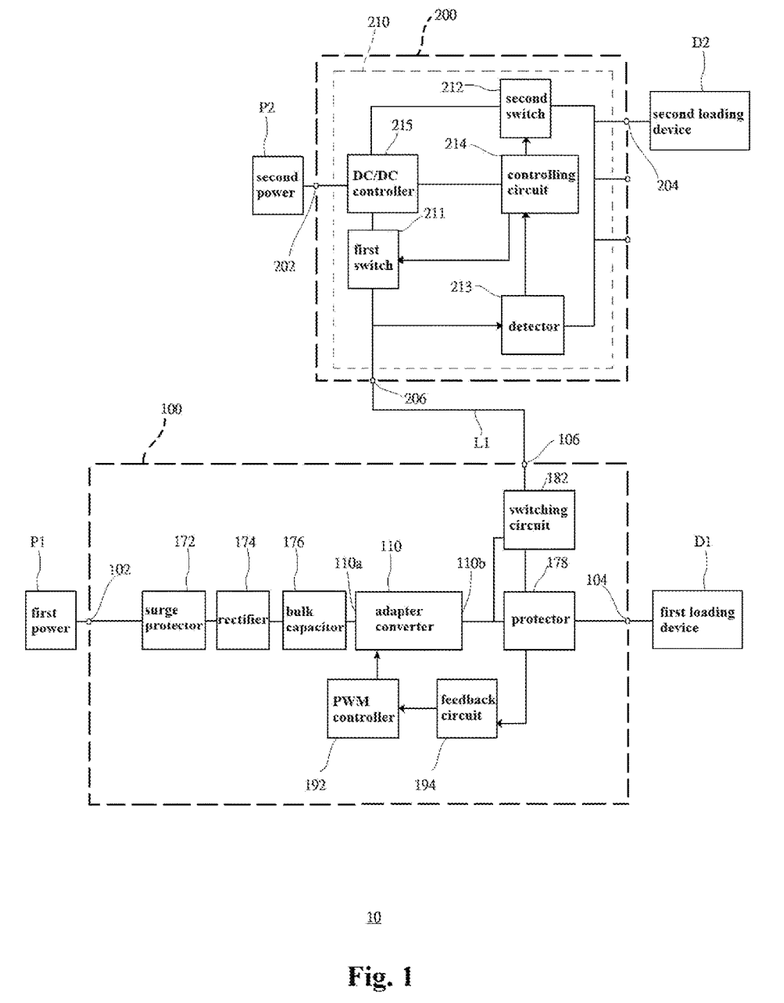
FIG. 1 is a schematic view illustrating a power supply system according to one embodiment of the present invention.

FIG. 1 is a schematic view illustrating a power supply system according to one embodiment of the present invention. Referring to FIG. 1, a power supply system 10 of the present embodiment comprises an adapter 100 and a converter 200. The adapter 100 has a first inputting terminal 102 and a first outputting terminal 104. In addition, in the present embodiment, the converter 200 has a detection controller 210, a second inputting terminal 202, a second outputting terminal 204 and a third outputting terminal 206. Wherein, the second inputting terminal 202 and the detection controller 210 are coupled electrically, and the second outputting terminal 204 and the third outputting terminal 206 are coupled to the detection controller 210 in parallel.

Wherein, the first inputting terminal 102 is suitable for coupling with a first power P1, and a first loading device D1 is suitable for coupling with the first outputting terminal 104. Besides, the second inputting terminal 202 is suitable for coupling with a second power P2, and a second loading device D2 is suitable for coupling with the second outputting terminal 204. Worth mention, the third outputting terminal 206 of the present embodiment is electrically coupled between the first inputting terminal 102 and the first outputting terminal 104 of the adapter 100 through external connection. Therefore, the detection controller 210 of the present embodiment drives the second power P2 supply to the first loading device D1 according to the power supply status of the first power P1.

In detail, the power supply system 10 of the present embodiment includes, for example, a first external wire L1. The adapter 100 includes, for example, a third inputting terminal 106 and an adapter body (not shown). The converter 200 includes, for example, a converter body (not shown). Wherein, the first inputting terminal 102 of the adapter 100, the first outputting terminal 104 and the third inputting terminal 106 are exposed out of the adapter body. The third inputting terminal 106 is electrically coupled between the first inputting terminal 102 and the first outputting terminal 104. On the other hand, the second inputting terminal 202, the second outputting terminal 204 and the third outputting terminal 206 of the converter 200 are exposed out of the converter body. Therefore, the first external wire L1 is electrically coupled between the third outputting terminal 206 of the converter 200 and the third inputting terminal 106 of the adapter 100, which makes the third outputting terminal 206 of the converter 200 couple between the first inputting terminal 102 and the first outputting terminal 104 of the adapter 100 electrically through external connection. Thus, the detection controller 210 can detect the power supply status of the first power P1, and drives the second power P2 supply to the first loading device D1 according to the power supply status of the first power P1.

From above, in the present embodiment, the first power P1 is, for example, a utility power. The first loading device D1 is, for example, an Optical Network Termination. On the other hand, the second power P2 is, for example, a mobile power. The converter 200 is, for example, a mobile power converter. The second loading device D2 is, for example, a mobile device. In the present embodiment, the second power P2 is coupled to the adapter 100 through the converter 200 located out of the adapter 100. Then, the second power P2 can couple to the adapter 100 electrically. Therefore, the detection controller 210 of the present embodiment can detect the power supply status of the first power P1, and drives the second power P2 supply to the first loading device D1 according to the power supply status of the first power P1. In other words, the converter 200 of the present embodiment can determine sequence of power supply, the converter 200 is a smart converter.

Further, when the first loading device D1 is electrically coupled to the first outputting terminal 104 of the adapter 100 and the first power P1 is in normal power supply status, the detection controller 210 of the converter 200 can detect the power operation between the first inputting terminal 102 and the first outputting terminal 104, and further determines that the power supply status of the first power P1 is normal. Therefore, the detection controller 210 can not make the second power P2 process any power operation for the first loading device D1. In other words, the second power P2 can supply to the second loading device D2, wherein the second loading device D2 is, for example, a mobile phone.

On the other hand, when the first loading device D1 is electrically coupled to the first outputting terminal 104 of the adapter 100 and the first power P1 is in abnormal power supply status, the detection controller 210 of the converter 200 can detects the power operation between the first inputting terminal 102 and the first outputting terminal 104 and determines that the power supply status of the first power P1 is abnormal. Therefore, the detection controller 210 drives the second power P2 supply to the first loading device D1, and drives the second power P2 stop supplying to the second loading device D2. Certainly, when the second power P2 is in the status with sufficient power, the second power P2 also can supply to the second loading device D2 continuously, the particulars described herein are not intended to limit the present embodiment. Wherein, the second power P2 of the present embodiment can be a DC uninterrupted power supply or a lead-acid batteries, the particulars described herein are not intended to limit the present embodiment. Besides, the foregoing abnormal power supply status is, for example, that the first power P1 can not provide power or the power provided by the first power P1 is not meet the specification of the first loading device D1.

Specifically, when the first loading device D1 is not electrically coupled to the first outputting terminal 104 of the adapter 100, and the first power P1 is in abnormal power supply status, the detection controller 210 of the converter 200 still drives the second power P2 supply to the second loading device D2 continuously.

In the present embodiment, the detection controller 210 includes a first switch 211, a second switch 212, a detector 213 and a controlling circuit 214. Wherein, the first switch 211 is electrically coupled between the second inputting terminal 202 and the third outputting terminal 206, and the second switch 212 is electrically coupled between the second inputting terminal 202 and the second outputting terminal 204. The detector 213 is electrically coupled to the third outputting terminal 206, and can detect power information transmitted between the first inputting terminal 102 and the first outputting terminal 104 of the adapter 100 through the third outputting terminal 206, and then generates a detecting result. In a preferred embodiment, the detector 213 is electrically coupled between the first switch 211 and the third outputting terminal 206, for example. Besides, the detector 213 can be a current detecting circuit, a current detector, a voltage detecting circuit, or a voltage detector. The particulars described herein are not intended to limit the present embodiment.

In addition, the controlling circuit 214 of the present embodiment is electrically coupled to detector 213 for receiving the detecting result. Therefore, the controlling circuit 214 of the present embodiment can control the first switch 211 and the second switch 212 according to the detecting result. In a preferred embodiment, when one of the first switch 211 and the second switch 212 is switched to be ON, the other of the first switch 211 and the second switch 212 is switched to be OFF. In detail, when power information transmitted between the first inputting terminal 102 and the first outputting terminal 104 of the adapter 100 is normal, the controlling circuit 214 will controls the control first switch 211 to be OFF and controls the second switch 212 to be ON, which drives the second power P2 supply the second loading device D2, and not supply to the first loading device D1. On the other hand, when power information transmitted between the first inputting terminal 102 and the first outputting terminal 104 of the adapter 100 is abnormal, the controlling circuit 214 will controls the first switch 211 to be ON and controls the second switch 212 to be OFF, which drives the second power P2 supply to the first loading device D1, and not supply to the second loading device D2. Wherein, the first switch 211 and the second switch 212 can be practiced in a relay or an electronic switch.

In other words, when the first power P1, for example, a utility power is in abnormal power supply status, the detector 213 of the detection controller 210 can detects that the power operation between the first inputting terminal 102 and the first outputting terminal 104 is abnormal. Therefore, the controlling circuit 214 of the detection controller 210 can controls the first switch 211 to be ON and controls the second switch 212 to be OFF according to the detecting result generated by the detector 213 for driving the second power P2 supply to the first loading device D1.

In a preferred embodiment, the detection controller 210 further includes a DC/DC controller 215. One terminal of the DC/DC controller 215 is electrically coupled to the second power P2, and another terminal of the DC/DC controller 215 is coupled to the second outputting terminal 204 and the third outputting terminal 206 electrically. Therefore, the power outputted by the second power P2 can be converted for providing suitable voltage to the first loading device D1 or the second loading device D2 by the DC/DC controller 215. Wherein, the DC/DC controller 215 can be changed as a DC/AC controller for practicing other design, the particulars described herein are not intended to limit the present embodiment.

In a preferred embodiment, the adapter also can includes an adapter converter 110. The adapter converter 110 is, for example, electrically coupled between the first inputting terminal 102 and the first outputting terminal 104. The third outputting terminal 206 of the present embodiment is, for example, electrically coupled between the adapter converter 110 and the first outputting terminal 104 through external connection. The adapter converter 110 can convert the power outputted by the first power P1 for providing suitable voltage to the first loading device D1. Besides, the foregoing adapter converter 110 can be a transformer, an isolated transformers or an isolated converter.

In a preferred embodiment, the adapter 100 further includes a surge protector 172, a rectifier 174 and a bulk capacitor 176. The rectifier 174 is, for example, a diode bridge. The surge protector, the rectifier and the bulk capacitor are, for example, coupled to the first side 110a of the adapter converter 110 in series. In addition, the adapter 100 also includes a protector 178. The protector 178 is, for example, electrically coupled to the second side 110b of the adapter converter 110. The protector 178 can be an over-voltage protector, an over-current protector or a short circuit protector.

In a preferred embodiment, adapter 100 further includes a switching circuit 182. One terminal of the switching circuit 182 is electrically coupled to the second side 110b of the adapter converter 110. Another terminal of the switching circuit 182 is, for example, coupled to the third inputting terminal 106. In the present embodiment, the switching circuit 182 can switch other suitable power supply paths according to the power supply status of the first power P1 for promoting the first loading device D1 work smoothly.

In a preferred embodiment, the adapter 100 further includes a PWM controller 192 and a feedback circuit 194. In the present embodiment, one terminal of the PWM controller 192 is electrically coupled to the first side 110a of the adapter converter 110, and another terminal of the PWM controller 192 is coupled to the feedback circuit 194. On the other hand, the feedback circuit 194 is electrically coupled between the second side 110b of the adapter converter 110 and the PWM controller 192. Therefore, the PWM controller 192 can detect the output of the feedback circuit for controlling the first side 110a of the adapter converter 110 and adjusting the power transmitted to the adapter converter 110 through the first inputting terminal 102.

In a preferred embodiment, the adapter converter 110 can be a transformer, an isolated converter, an isolated transformer, a non-isolated converter or a non-isolated transformer.

Figure 2:
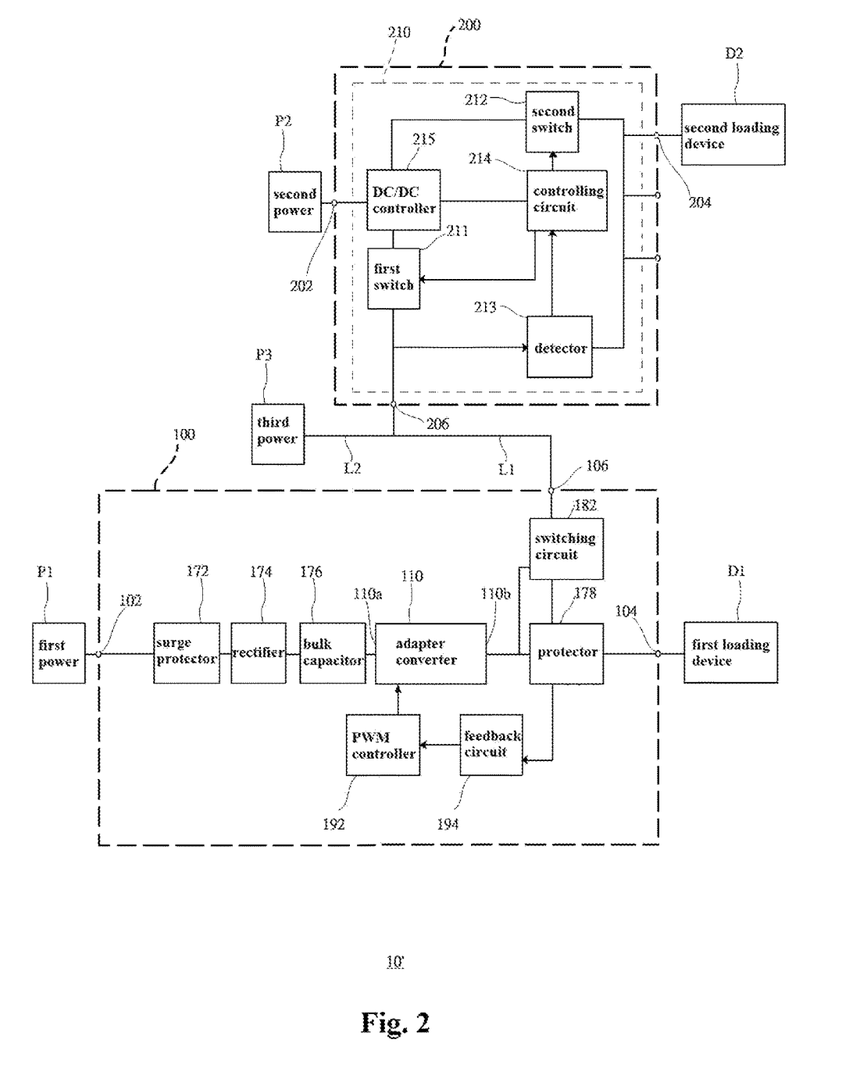
FIG. 2 is a schematic view illustrating a power supply system according to another embodiment of the present invention.

FIG. 2 is a schematic view illustrating a power supply system according to another embodiment of the present invention. Referring to FIG. 2, the power supply system 10' of the present embodiment is similar to the power supply system 10 of the foregoing embodiment. The main difference between the power supply system 10 and the power supply system 10' is that the power supply system 10' of the present embodiment further comprises a third power P3. Wherein, the third power P3 is electrically coupled between the first inputting terminal 102 and the first outputting terminal 104 of the adapter 100.

In detail, the power supply system 10' of the present embodiment also apply a second external wire L2 to be coupled between the third outputting terminal 206 of the converter 200 and the third inputting terminal 106 of the adapter 100 electrically. In other words, in the present embodiment, the third outputting terminal 206 of the converter 200 and the third power P3 are both electrically coupled between the first inputting terminal 102 and the first outputting terminal 104 of the adapter 100 through external connection. Therefore, the detection controller 210 can drives the second power P2 supply to the first loading device D1 according to power supply status of the first power P1 and power supply status of the third power P3.

From above, in the present embodiment, the first power P1 is, for example, a utility power. The first loading device D1 is, for example, an Optical Network Termination. On the other hand, the second power P2 is, for example, a mobile power. Te converter 200 is, for example, a mobile power converter. The second loading device D2 is, for example, a mobile device. In addition, the third power P3 of the present embodiment is, for example, a DC uninterrupted power supply. Similar to the foregoing embodiment, the second power P2 of the present embodiment can be connect to the adapter 100 conveniently through the converter 200 in the mode of external connection. Therefore, the second power P2 can be coupled to the adapter 100 electrically. Similarly, the third power P3 of the present embodiment can be connect to the adapter 100 conveniently through external connection. Therefore, the detection controller 210 of the present embodiment can detect power supply status of the first power P1 and power supply status of the third power P3, and drives the second power P2 supply to the first loading device D1 according to power supply status of the first power P1 and power supply status of the third power P3.

Further, when the first power P1 is in normal power supply status, the detection controller 210 of the converter 200 can detect the power operation between the first inputting terminal 102 and the first outputting terminal 104, and further determines that power supply status of the first power P1 is normal. Therefore, the detection controller 210 can not make the second power P2 process any power operation for the first loading device D1, but make the second power P2 supply to the second loading device D2, for example, mobile phone.

On the other hand, when power supply status of the first power P1 is abnormal, and power supply status of the third power P3 is normal, the third power P3 will take over the operation of power supply for the first loading device D1. Therefore, the detection controller 210 of the converter 200 can detect the power operation between the first inputting terminal 102 and the first outputting terminal 104. Therefore, the second power P2 can supply the second loading device D2, for example, a mobile phone. Worth mention, when the first power P1 and third power P3 are both in abnormal power supply status, the detection controller 210 of the present embodiment can detect that the power operation between the first inputting terminal 102 and the first outputting terminal 104 is abnormal. Then, the detection controller 210 can drive the second power P2 supply to the first loading device D1, and drives the second power P2 stop supplying to the second loading device D2. Wherein, the third power P3 of the present embodiment can be lead-acid batteries, the particulars described herein are not intended to limit the present embodiment.

To sum up, the converter 200 of the present invention can be connected to the adapter 100 coupled to the loading device through external connection. Therefore, suitable auxiliary power devices can be coupled to the adapter 100 electrically through converter 200 located outside of the adapter 100. Therefore, when the power source coupled to the adapter originally is abnormal, the auxiliary power located outside of the adapter 100 can be provided for power supplying timely. Further, the loading device can continue to work normally. Certainly, when the power source coupled to the adapter originally is normal, the foregoing auxiliary power device also can be removed conveniently.

In addition, because these auxiliary powers are coupled to the adapter electrically through the converter having the detection controller in the present invention, thus the converter having the detection controller in the present invention can make the auxiliary power supply to the loading device timely when power information of the adapter is abnormal. Worth mention, when power information of the adapter is normal, the converter having the detection controller can control the auxiliary power to supply for other loading devices (such as the mobile phone). Therefore, the power supply system of the present invention can provide various loading devices to execute power operation. Besides, the converter of the present invention can determine sequence of power supply, the converter 200 is a smart converter.

Besides, because the auxiliary power, for example, a mobile power, a DC uninterrupted power supply or lead-acid batteries are easy to get, thus the present invention can apply the converter having the detection controller to detect and integrate the auxiliary powers for executing power operation to various loading devices timely and effectively.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply system, comprising:
    an adapter, having a first inputting terminal and a first outputting terminal, wherein the first inputting terminal is suitable for coupling with a first power, and a first loading device is suitable for coupling with the first outputting terminal; and
    a converter, having a detection controller, a second inputting terminal, a second outputting terminal and a third outputting terminal, the second inputting terminal and the detection controller are coupled electrically, the second outputting terminal and the third outputting terminal are coupled to the detection controller in parallel, and the third outputting terminal is electrically coupled between the first inputting terminal and the first outputting terminal of the adapter through external connection, wherein the second inputting terminal is suitable for coupling with a second power, and a second loading device is suitable for coupling with the second outputting terminal;
    wherein, the detecting controller drives the second power supply to the first loading device according to the power supply status of the first power.

2. The power supply system according to claim 1, wherein when the power supply status of the first power is normal, the detection controller drives the second power supply to the second loading device, when the power supply status of the first power is abnormal, the detection controller drives the second power supply to the first loading device, and drives the second power supply to the second loading device continuously or stop supplying to the second loading device.

3. The power supply system according to claim 1, wherein the detection controller comprising:
    a first switch, electrically coupled between the second inputting terminal and the third outputting terminal;
    a second switch, electrically coupled between the second inputting terminal and the second outputting terminal;
    a detector, electrically coupled to the third outputting terminal for detecting power information transmitted between the first inputting terminal and the first outputting terminal of the adapter through the third outputting terminal, and then generates a detecting result; and
    a controlling circuit, electrically coupled to the detector for receiving the detecting result, and controls the first switch and the second switch according to the detecting result.

4. The power supply system according to claim 3, wherein when power information transmitted between the first inputting terminal and the first outputting terminal of the adapter is normal, the controlling circuit controls the first switch to be OFF, and controls the second switch to be ON, which drives the second power supply to the second loading device, when power information transmitted between the first inputting terminal and the first outputting terminal of the adapter is abnormal, the controlling circuit controls the first switch to be ON, and controls the second switch to be OFF, which drives the second power supply to the first loading device.

5. The power supply system according to claim 3, wherein when the status of one of the first switch and the second switch is ON, the status of another of the first switch and the second switch is OFF.

6. The power supply system according to claim 3, wherein the detector is electrically coupled between the first switch and the third outputting terminal for detecting power information transmitted between the first inputting terminal and the first outputting terminal of the adapter through the third outputting terminal.

7. The power supply system according to claim 3, wherein the detection controller further comprises a DC/DC controller, one terminal of the DC/DC controller is electrically coupled to the second power, and another terminal of the DC/DC controller is coupled with the second outputting terminal and the third outputting terminal.

8. The power supply system according to claim 3, wherein the detector is a current detecting circuit, a current detector, a voltage detecting circuit or a voltage detector.

9. The power supply system according to claim 1, further comprises a first external wire, and the adapter further comprises a third inputting terminal and an adapter body, the converter further comprises a converter body, the first inputting terminal, the first outputting terminal and the third inputting terminal are exposed out of the adapter body, and the third inputting terminal is electrically coupled between the first inputting terminal and the first outputting terminal, the second inputting terminal, the second outputting terminal and the third outputting terminal are exposed out of the converter body, the first external wire is electrically coupled between the third outputting terminal of the converter and the third inputting terminal of the adapter, which makes the third outputting terminal of the converter is electrically coupled between the first inputting terminal and the first outputting terminal of the adapter through external connection.

10. The power supply system according to claim 1, wherein the first power is a utility power, the second power is a mobile power or a DC uninterrupted power supply, the converter is a mobile power converter, the first loading device is an Optical Network Termination, and the second loading device is a mobile device.

11. A power supply system, comprising:
an adapter, having a first inputting terminal and a first outputting terminal, wherein the first inputting terminal is suitable for coupling with a first power, and a first loading device is suitable for coupling with the first outputting terminal;
a converter, having a detection controller, a second inputting terminal, a second outputting terminal and a third outputting terminal, the second inputting terminal and the detection controller are coupled electrically, the second outputting terminal and the third outputting terminal are coupled to the detection controller in parallel, and the third outputting terminal is electrically coupled between the first inputting terminal and the first outputting terminal of the adapter through external connection, wherein the second inputting terminal is suitable for coupling with a second power, and a second loading device is suitable for coupling with the second outputting terminal; and
a third power, electrically coupled between the first inputting terminal and the first outputting terminal of the adapter;

wherein, the detection controller drives the second power supply to the first loading device according to the power supply status of the first power and the third power.

12. The power supply system according to claim 11, wherein when the power supply status of the first power is normal, the detection controller drives the second power supply to the second loading device, when the power supply status of the first power is abnormal, and the power supply status of the third power is normal, the detection controller drives the third power supply to the first loading device, and drives the second power supply to the second loading device continuously, when the power supply status of the first power and the third power is abnormal, the detection controller drives the second power supply to the first loading device, and drives the second power supply to the second loading device continuously or stop supplying to the second loading device.

13. The power supply system according to claim 11, wherein the detection controller comprising:
a first switch, electrically coupled between the second inputting terminal and the third outputting terminal;
a second switch, electrically coupled between the second inputting terminal and the second outputting terminal;
a detector, electrically coupled to the third outputting terminal for detecting power information transmitted between the first inputting terminal and the first outputting terminal of the adapter through the third outputting terminal, and then generates a detecting result; and
a controlling circuit, electrically coupled to the detector for receiving the detecting result, and controls the first switch and the second switch according to the detecting result.

14. The power supply system according to claim 13, wherein when power information transmitted between the first inputting terminal and the first outputting terminal of the adapter is normal, the controlling circuit controls the first switch to be OFF, and controls the second switch to be ON, which drives the second power supply to the second loading device, when power information transmitted between the first inputting terminal and the first outputting terminal of the adapter is abnormal, the controlling circuit controls the first switch to be ON, and controls the second switch to be OFF, which drives the second power supply to the first loading device.

15. The power supply system according to claim 13, wherein when the status of one of the first switch and the second switch is ON, the status of another of the first switch and the second switch is OFF.

16. The power supply system according to claim 13, wherein the detector is electrically coupled between the first switch and the third outputting terminal for detecting power information transmitted between the first inputting terminal and the first outputting terminal of the adapter through the third outputting terminal.

17. The power supply system according to claim 13, wherein the detection controller further comprises a DC/DC controller, one terminal of the DC/DC controller is electrically coupled to the second power, and another terminal of the DC/DC controller is coupled with the second outputting terminal and the third outputting terminal.

18. The power supply system according to claim 13, wherein the detector is a current detecting circuit, a current detector, a voltage detecting circuit or a voltage detector.

19. The power supply system according to claim 11, further comprises a first external wire and a second external wire, and the adapter further comprises a third inputting terminal and an adapter body, the converter further comprises a converter body, the first inputting terminal, the first outputting terminal and the third inputting terminal are exposed out of the adapter body, and the third inputting terminal is electrically coupled between the first inputting terminal and the first outputting terminal, the second inputting terminal, the second outputting terminal and the third outputting terminal are exposed out of the converter body, the first external wire and the second external wire are electrically coupled between the third outputting terminal of the converter and the third inputting terminal of the adapter, which makes the third outputting terminal of the converter and the third power are electrically coupled between the first inputting terminal and the first outputting terminal of the adapter through external connection.

20. The power supply system according to claim 11, wherein the first power is a utility power, the second power is a mobile power, the third power is a DC uninterrupted power supply, the converter is a mobile power converter, the first loading device is an Optical Network Termination, and the second loading device is a mobile device.

\* \* \* \* \*